US011533335B2

(12) United States Patent
Hale (10) Patent No.: US 11,533,335 B2
(45) Date of Patent: Dec. 20, 2022

(54) FAST INTERNETWORK RECONNAISSANCE ENGINE

(71) Applicant: Charter Communications Operating, LLC, St. Louis, MO (US)

(72) Inventor: Robert Hale, St. Peters, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 580 days.

(21) Appl. No.: 16/550,796

(22) Filed: Aug. 26, 2019

(65) Prior Publication Data

US 2021/0067547 A1 Mar. 4, 2021

(51) Int. Cl.
*H04L 9/40* (2022.01)

(52) U.S. Cl.
CPC ...... *H04L 63/1466* (2013.01); *H04L 63/0236* (2013.01); *H04L 63/105* (2013.01); *H04L 63/145* (2013.01); *H04L 63/1416* (2013.01); *H04L 63/162* (2013.01)

(58) Field of Classification Search
CPC ............. H04L 63/1466; H04L 63/0236; H04L 63/105; H04L 63/1416; H04L 63/145; H04L 63/162
See application file for complete search history.

(56) References Cited

U.S. PATENT DOCUMENTS

| | | | |
|---|---|---|---|
| 7,793,338 B1 | 9/2010 | Beddoe et al. | |
| 7,898,982 B2 | 3/2011 | Sridhar et al. | |
| 8,813,236 B1 | 8/2014 | Saha et al. | |
| 10,965,702 B2* | 3/2021 | Higgins | .............. H04L 63/1466 |
| 2006/0203815 A1 | 9/2006 | Couillard | |
| 2007/0147261 A1* | 6/2007 | Schumacher | ........... H04L 41/12 370/254 |
| 2010/0176962 A1* | 7/2010 | Yossef | ................... H04Q 1/136 709/224 |
| 2014/0280907 A1* | 9/2014 | Rothstein | ................ H04L 67/16 709/224 |
| 2019/0020637 A1 | 1/2019 | Andersen et al. | |
| 2019/0245759 A1* | 8/2019 | Mukerji | .................. H04L 67/16 |
| 2020/0120107 A1* | 4/2020 | McGrew | ................ G06N 20/00 |
| 2020/0137021 A1* | 4/2020 | Janakiraman | ....... H04L 61/4511 |

(Continued)

*Primary Examiner* — Joseph P Hirl
*Assistant Examiner* — Stephen T Gundry
(74) *Attorney, Agent, or Firm* — The Marbury Law Group, PLLC (57) ABSTRACT

Systems, methods, and devices for performing a layer-2 scan of one or more communication networks to collect detailed information regarding the components/devices attached to the networks at a particular location (e.g., metropolitan area, city, university campus, building, floor within a building, etc.), and using the collected detailed information to generate a device profile for each of the devices attached to the one or more communication networks at the particular location. A server computing device may use the generated device profiles to perform inventory control operations, wireless vendor integration operations and/or security operations. For example, the server may use the device profiles to determine whether a component/device attached to any of the networks is non-benign (e.g., improperly configured, running malware, operated by hacker, spoofing a server, dropping packets, etc.), and initiate a reactive or mitigating action (e.g., quarantine the device, etc.).

45 Claims, 6 Drawing Sheets

(56) References Cited

U.S. PATENT DOCUMENTS

| | | | |
|---|---|---|---|
| 2020/0137024 A1* | 4/2020 | Janakiraman | H04L 63/0236 |
| 2020/0137093 A1* | 4/2020 | Janakiraman | H04L 63/0263 |
| 2020/0137094 A1* | 4/2020 | Janakiraman | G06N 20/00 |
| 2020/0137115 A1* | 4/2020 | Janakiraman | H04L 43/028 |
| 2020/0159603 A1* | 5/2020 | Panda | G06Q 30/016 |
| 2020/0162371 A1* | 5/2020 | Musku | H04L 45/54 |
| 2020/0220746 A1* | 7/2020 | Shribman | H04W 48/18 |
| 2020/0280568 A1* | 9/2020 | Bratspiess | H04L 63/1416 |
| 2020/0344084 A1* | 10/2020 | Shribman | H04L 69/16 |
| 2020/0344203 A1* | 10/2020 | Mermoud | H04L 61/5014 |
| 2020/0356618 A1* | 11/2020 | Shribman | H04L 67/01 |
| 2020/0358858 A1* | 11/2020 | Shribman | H04L 63/1466 |
| 2020/0358879 A1* | 11/2020 | Shribman | H04W 4/80 |
| 2020/0382502 A1* | 12/2020 | Cheng | H04L 63/20 |
| 2020/0382529 A1* | 12/2020 | Higgins | H04L 63/1425 |
| 2020/0389469 A1* | 12/2020 | Litichever | H04L 63/029 |
| 2020/0409957 A1* | 12/2020 | Zhang | G06F 16/24554 |
| 2021/0044608 A1* | 2/2021 | Deaguero | H04L 41/142 |
| 2021/0288895 A1* | 9/2021 | Wu | H04L 43/12 |

* cited by examiner

FAST INTERNETWORK RECONNAISSANCE ENGINE

BACKGROUND

A "network scanner" or "port scanner" may be a network component that performs port discovery and/or service detection operations to detect open TCP/UDP ports and services on the network. These scanners may also perform TCP/IP stack fingerprinting or operating system fingerprinting operations on a target IP address or hostname Fingerprinting may include the passive collection of configuration attributes from a remote device during standard layer 4 network communications. Conventional network/port scanners operate within a network, and do not have internetwork visibility. In addition, because they operate at higher layer/levels of the OSI model, conventional network/port scanners cannot traverse, bypass or avoid some firewalls. A nefarious actor may avoid detection by a conventional network/port scanner by setting up a firewall that intercepts and drops packets directed to the device or other network endpoints.

SUMMARY

The various aspects include methods of profiling components in one or more communication networks, including performing, by a processor in a server computing device, a layer-2 scan of the one or more communication networks to collect detailed information regarding devices attached to the one or more communication networks at a particular location, and using, by the processor, the collected detailed information to generate a device profile for each of the devices attached to the one or more communication networks at the particular location.

In some aspects, the methods may include using the generated device profile to perform at least one or more of an inventory control operation, a wireless vendor integration operation, or a security operation. In some aspects, performing the security operations may include determining whether any of the devices attached to any of the one or more communication networks is non-benign, and initiating a mitigating action in response to determining that a device is non-benign.

In some aspects, initiating the mitigating action may include performing at least one or more of generating a notification message identifying the devices that are non-benign, or quarantining the devices that are non-benign. In some aspects, performing the layer-2 scan of the one or more communication networks to collect the detailed information regarding the devices attached to the one or more communication networks at the particular location may include performing operations that include at least one or more of learning a network topology of the one or more communication networks, learning the device interconnects of the devices attached to the one or more communication networks at the particular location, or providing basic identity management to the devices attached to the one or more communication networks at the particular location.

In some aspects, performing the layer-2 scan of the one or more communication networks to collect the detailed information regarding the devices attached to the one or more communication networks at the particular location may include using at least one or more of a networking protocol, a network scan tool, a programming language, a low level socket communication, artificial intelligence, machine learning, or modular distributed architecture to fingerprint or analyze at least one or more of the one or more communication networks, or the devices attached to the one or more communication networks at the particular location. In some aspects, performing the layer-2 scan of the one or more communication networks to collect the detailed information regarding the devices attached to the one or more communication networks at the particular location may include acquiring or consuming data from at least one or more of a command line system, an application programing interface (API), a database, an inventory control system, a web service, or a common network protocol.

In some aspects, performing the layer-2 scan of the one or more communication networks to collect the detailed information regarding the devices attached to the one or more communication networks at the particular location may include accessing host endpoints and resource devices to collect information from various sources and ports, including at least one or more of routing and switching infrastructure (TCP port 22), windows management instrumentation (WMI) host access (TCP ports 135, 137 or 139), simple network management protocol (SNMP) host access UDP port 161, hypertext transfer protocol (HTTP) host access (TCP ports 80 or 443), or Mysql DB internal (TCP port 3306). In some aspects, performing the layer-2 scan of the one or more communication networks to collect the detailed information regarding the devices attached to the one or more communication networks at the particular location may include connecting to a switching element to obtain medium access control (MAC) address information and learn about a directly connected host.

In some aspects, performing the layer-2 scan of the one or more communication networks to collect the detailed information regarding the devices attached to the one or more communication networks at the particular location may include performing discovery operations that include connecting to switches or switching elements based on pre-defined internet protocol (IP) address data located within a service provider network, obtaining medium access control (MAC) address information from a switching element in the one or more communication networks, using the obtained MAC address information to identify one or more directly connected hosts, determining a switch types of the switching element, and using a secure shell (SSH) console to connect to the switching element and collect MAC address data. In some aspects, the methods may include performing discovery operations that further include using the predefined IP address data to determine a router type of a routing element in the one or more communication networks, using the SSH console to connect to the routing element, obtaining address resolution protocol (ARP) information from the routing element, and using the ARP information to generate an IP-to-MAC address correlation for one or more of the devices attached to the one or more communication networks at the particular location.

In some aspects, the methods may include performing discovery operations that further include using the IP-to-MAC address correlation to identify an IP network or IP subnet at the particular location, formulating network TCP scan prerequisites based on the identified IP network or IP subnet, and using the network TCP scan prerequisites to initiate a network TCP scan of well-known application service protocol ports.

In some aspects, the methods may include performing discovery operations that further include collecting information from internal inventory databases to learn known device inventory properties, establishing database connections to internal databases to learn details of existing equipment, using a network management solution to authenticate one or more of the devices attached to the one or more communication networks at the particular location and discover more attributes from hosts identified during the network TCP scan, and using pre-defined service accounts, SNMP strings, HTTP CALLS or administrative accounts to access equipment or obtain detailed inventory information. In some aspects, the methods may include performing discovery operations that further include determining a management status and general characteristics of the devices attached to the one or more communication networks at the particular location, and generating a device profile for the devices attached to the one or more communication networks at the particular location.

In some aspects, generating the device profile for each of the connected devices based on any or all of the collected or generated information may include generating a device profile that may include at least one or more of a device IP information element (IE), a hostname IE, a parent switch IP IE, a parent switch name IE, a MAC address IE, a port IE, a vendor IE, management IE, or a location IE.

Further aspects may include a server computing device having a processor configured with processor-executable instructions to perform various operations corresponding to the methods discussed above. Further aspects may include a non-transitory processor-readable storage medium having stored thereon processor-executable instructions configured to cause a processor in a server computing device to perform various operations corresponding to the method operations discussed above. Further aspects may include a server computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and network components (e.g., server computing devices, etc.) configured to implement the methods, for performing a layer-2 scan of one or more communication networks to collect detailed information regarding the components/devices attached to the networks at a particular location (e.g., metropolitan area, city, university campus, building, floor within a building, etc.). A network component (or one or more server computing devices that implement all or portions of a fast internetwork reconnaissance engine, etc.) may be configured to use the collected information to generate a detailed network map of the location across multiple networks and/or to generate device profiles for both authenticated devices and components/devices that are not authenticated as part of the relevant domain (e.g., corporate network domain, etc.). The network component may use the detailed network map and/or device profiles to perform inventory control operations, wireless vendor integration operations, and/or security operations. For example, the network component may use the detailed network map and/or device profiles to determine whether a component/device attached to any of the networks is non-benign (e.g., improperly configured, running malware, operated by hacker, spoofing a server, dropping packets, etc.). The network component may initiate a reactive or mitigating action (e.g., quarantine the device, etc.) in response to determining that a component/device attached to the network at a particular location is non-benign.

The term "service provider network" is used generically herein to refer to any network suitable for providing users with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), and similar electronic devices which include a programmable processor and memory and circuitry for providing the functionality described herein.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The Open Systems Interconnection model (OSI model) characterizes and standardizes the communication functions of a telecommunication or computing network, and supports interoperability of diverse communication systems with standard protocols. The OSI model partitions a communication system into layers, namely a physical layer, a data link layer, a network layer, a transport layer, a session layer, a presentation layer, and an application layer. The physical layer, or layer 1, is responsible for the transmission and reception of unstructured raw data between a device and a physical transmission medium, and converts the digital bits into electrical, radio, or optical signals. The data link layer, or layer 2, is the protocol layer that transfers data between adjacent network nodes in a wide area network (WAN) or between nodes on the same local area network (LAN) segment. The network layer, or layer 3, is responsible for packet forwarding including routing through intermediate routers.

Generally, a switch/router is a network layer (layer 3) component that is configured to connect computers and/or networks to one another, and/or to forward data packets between nodes in a computer network. A switch/router may include one or more control plane components and/or one or more forwarding plane components. The forwarding plane components may be configured to determine whether to forward, drop, consume or replicate packets based on their MAC address, IP address, VLAN ID, etc. The control plane components may be configured to implement or perform various control plane functions/operations, which may include determining or drawing a network topology, managing the information in routing tables, populating or updating a routing information base (RIB) or forwarding information base (FIB), analyzing packets, defining or determining the packets that are to be discarded by the router, defining or determining the packets that are to receive preferential treatment, and other similar functions or operations. Directly connected networks/hosts may be added to a router's routing table if the interface connected to the network has an IP address configured and is in the up and up state. Connected routes take precedence over static or dynamically discovered routes because they have the administrative distance value of 0 (the lowest possible value).

An identity service engine (ISE) may be a network component that is configured to facilitate or manage access control for a network by requiring that computing devices seeking access to a network platform authenticate themselves through the switch/router. For example, a computing device that seeks access to the network platform may provide authentication information to a switch (i.e., the switch through which the device attempts to access the network). The switch may pass the authentication information to the ISE monitoring component, which may authenticate and allow the device to access to the network. The ISE component may store information regarding the access point, switch, port, etc. through which the device accesses the network platform. The ISE component may also store information regarding the authenticated device (e.g., the device's MAC address, user ID, machine ID, the time of authentication, etc.).

The transmission control protocol (TCP) provides a communication service between an application program and the Internet Protocol (IP). The user datagram protocol (UDP) is an alternative communications protocol to TCP that is used primarily for establishing low-latency and loss-tolerating connections between applications on the internet. The address resolution protocol (ARP) is a communication protocol used for discovering the link layer address, such as a medium access control (MAC) address, associated with a given internet layer address.

Certain parameters within the TCP/UDP protocol are left up to the implementation, and different operating systems (and different versions of the same operating system) may set different defaults for these values. These fields may be combined to form a fingerprint (e.g., a 67-bit signature, etc.) for the target machine that may be used to infer the remote machine's operating system. This process is sometimes referred to as OS fingerprinting.

Network ports are communication endpoints for a computing device connected to the Internet or network. For example, common TCP/UDP network ports include port 21 for file transfer protocol (FTP), port 22 for secure shell (SSH), port 23 for telnet, port 25 for simple mail transfer protocol (SMTP), port 80 for hypertext transfer protocol (HTTP), port 143 for internet message access protocol (IMAP), and port 3389 for remote desktop protocol (RDP).

The conventional network components discussed above (e.g., network/port scanners, ISE, switch/router, etc.) may collectively authenticate devices, scan the network, draw a network topology, and perform OS fingerprinting from the TCP/UDP perspective. However, conventional network components do not perform a layer-2 network scan that traverses, bypasses or avoids firewalls, consume "directly connected" information from the switching network, collect sufficiently detailed information regarding the computing devices connected to the network, or provide a comprehensive, holistic, intelligent, dynamic or detailed view of the network topology for a particular location. These conventional network components also do not generate comprehensive or sufficiently detailed network maps and device profiles that could be used to determine whether a component/device at a particular location and/or associated with any of a plurality of networks is non-benign (e.g., improperly configured, unauthorized, running malware, operated by hacker, spoofing a server, dropping packets, etc.).

The various embodiments include network components configured to perform a layer-2 network scan that traverses, bypasses or avoids firewalls, consumes "directly connected" information from the switching network, collects detailed information regarding the computing devices connected to the network, generates detailed device profiles, and uses the information to provide a comprehensive, holistic, intelligent, dynamic and detailed view of the network topology based on physical locations of the devices. The network components may use the detailed network map and/or device profiles to perform inventory control operations, wireless vendor integration operations, and/or security operations. For example, the network components may use the detailed network map and/or device profiles to determine whether a component/device attached to any of the networks is non-benign (e.g., improperly configured, running malware, operated by hacker, spoofing a server, dropping packets, etc.). The network component may initiate a reactive or mitigating action (e.g., quarantine the device, etc.) in response to determining that a component/device attached to the network at a particular location is non-benign.

Some embodiments may include a network component that is configured to learn network topology, device interconnects, and provide basic identity management.

In some embodiments, the network component may be configured to leverage networking protocols, network scan tools, programming languages, low level socket communication, Artificial Intelligence/Machine Learning and modular distributed architecture to fingerprint and analyze network systems.

In some embodiments, the network component may be configured to control, acquire, or consume data from various command line systems, application programing interfaces (APIs), databases, inventory control system, web services and/or common network protocols.

In some embodiments, the network component may be configured to access to host endpoints and resource devices (e.g., within the RFC1918 infrastructure space). The network component access and/or collect information from various sources and ports, including routing and switching infrastructure (TCP port 22), windows management instrumentation (WMI) host access (TCP ports 135, 137 and 139), simple network management protocol (SNMP) host access UDP port 161, hypertext transfer protocol (HTTP) host access (TCP ports 80 and 443), Mysql DB internal (TCP port 3306), general port scan access to infrastructure, etc.

In some embodiments, the network component may be configured to connect to switching elements within the infrastructure to obtain MAC Address information in order to learn about directly connected hosts.

In some embodiments, the network component may be configured to perform discovery operations. To reduce or eliminate interruption of common daily network activities, in some embodiments, the network component may be configured to perform the discovery operations at specific times (e.g., 3 PM, etc.) associated with low network traffic or activity.

The discovery operations may include connecting to switches or switching elements based on predefined IP address data located within the service provider network infrastructure, obtaining MAC address information from the switches or switching elements, using the obtained MAC address information to learn about directly connected hosts, determining the types of switches present in the relevant portions of network or which service a target location, using a secure shell (SSH) (e.g., TCP PORT 22) console to connect to the switches and collect MAC address data, and/or other similar operations for collected MAC data.

The discovery operations may further include using predefined network IP address data located within the service provider network infrastructure to determine the types of routers or routing elements in the network, using the SSH (TCP port 22) console to connect to the routers or routing elements, obtaining ARP information from the routers or routing elements, and using the ARP information to collect or generate data representing or characterizing IP-to-MAC address associations.

The discovery operations may also include determining or generating a IP and MAC address correlation, using the correlation to learn about the relevant IP networks/subnets associated with a target location, formulating network TCP scan prerequisites, and using the learned IP network data (e.g., information learned about the IP networks/subnets based on the internal IP and MAC address correlations) to initiate a network TCP scan of well-known application service protocol ports. The well-known application service protocol ports may include ports 21-23, 25, 53, 80, 110, 119, 123, 135, 137, 139, 143, 161, 443, 902, 3000, 3389, 5900, 5901, 8443, and 9100.

The discovery operations may also include collecting information from internal inventory databases to learn known device inventory properties, establishing database connections to internal databases to learn about details of existing equipment, using network management solutions to authenticate devices and discover more attributes from hosts learned from the TCP scan, and using pre-defined service accounts, SNMP strings, HTTP CALLS and/or administrative accounts to access equipment and obtain detailed inventory information.

The discovery operations may also include correlating any or all of the collected data, using the correlated data to determine the management status and general characteristics of connected devices, and generating a detailed network map and/or device profiles for each of the connected devices based on any or all of the collected or generated information. A device profile may include a device IP information element (IE), a hostname IE, a parent switch IP IE, a parent switch name IE, a MAC address IE, a port IE, a vendor IE, management IE, a physical or real-world location IE, and/or other similar information. The physical or real-world location IE may include a country IE, a state IE, a street address IE, a floor IE, a server rack IE, and/or other similar information.

The various embodiments may improve the performance, security and/or functioning of the network and user devices, network security systems, inventory control systems, and wireless vender integration/management systems. Additional improvements to the performance, security and functioning of the communication network, devices deployed within the communication network, devices that utilize the communication network, and devices that provide services for the communication network will be evident from the disclosures herein.

Figure 1:
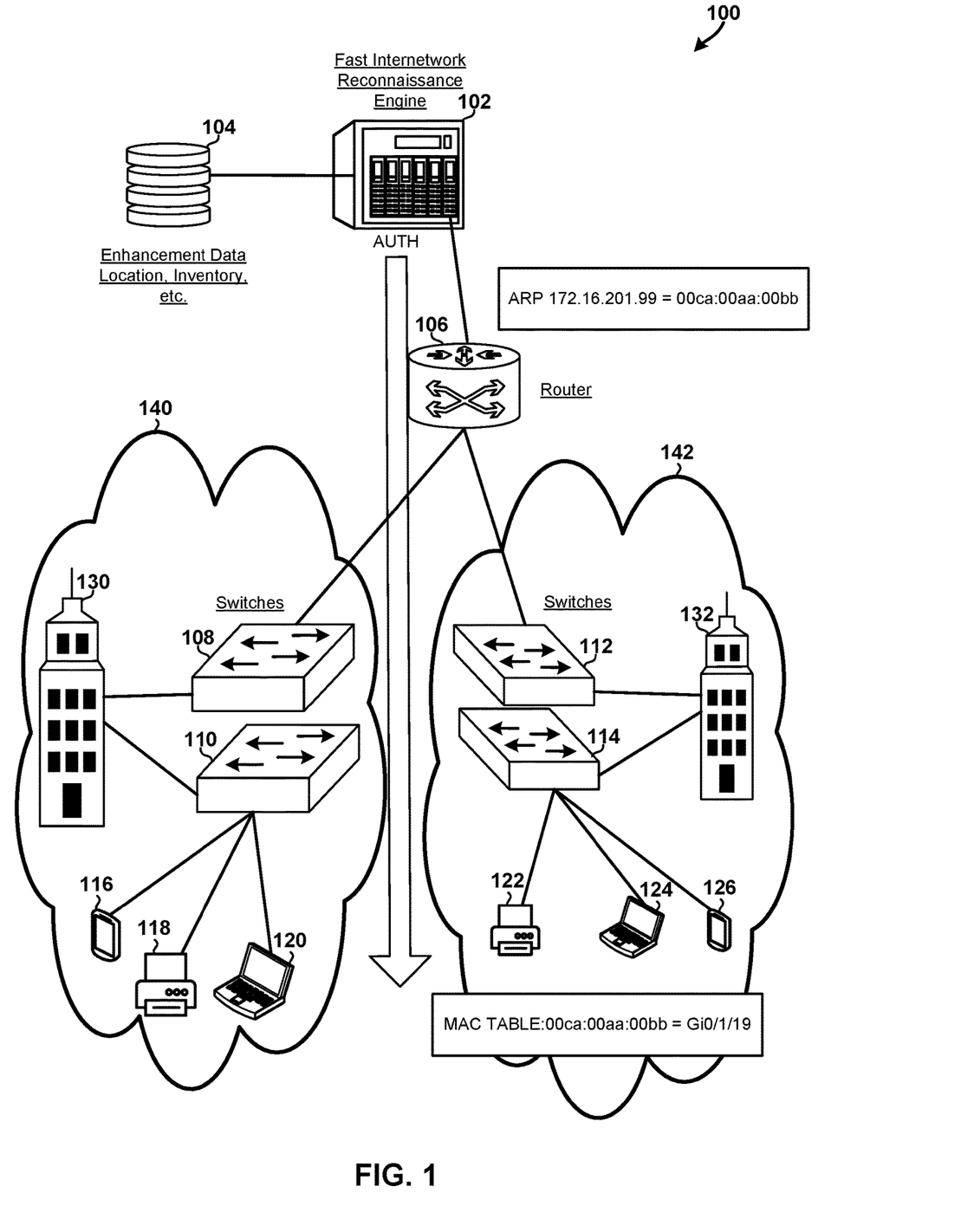
FIG. 1 is a block diagram illustrating components and communication links in an example network configured to perform layer-2 scanning operations in accordance with the various embodiments.

FIG. 1 illustrates various components and communication links in system 100 that includes a fast internetwork reconnaissance engine 102 network component that may be configured to perform a detailed layer-2 internetwork scan to generate detailed device profiles and network topologies that account for the physical locations of the devices in accordance with some embodiments. In the example illustrated in FIG. 1, the system 100 includes the fast internetwork reconnaissance engine 102, an plurality of databases 104 (e.g., enhancement data, location, inventory, etc.), a router 106, switches 108-114, and user equipment devices 116-126. One or more of switches 108 and 110 may be physically located in a first building 130, communicatively coupled to the router 106 or user equipment devices 116-120, and included as part of a first network 140. One or more of switches 112 and 114 may be physically located in a second building 132, communicatively coupled to the router 106 or user equipment devices 122-126, and included as part of a second network 142.

For ease of reference and to focus the discussion on the relevant features, in the example illustrated in FIG. 1, the user equipment devices 116-126 are shown to include direct communication links to the switches 110 and 114. However, it should be understood that other network components (e.g., access point, hub, customer premise device, wireless router, etc.), could be included in the system 100 and used to establish communication links between the user equipment devices 116-126 and the switches 110 and 114. It should also be understood that in some embodiments one or more of the switches (e.g., switches 110 and 114) may be located at a user/customer premise site.

Figure 2:
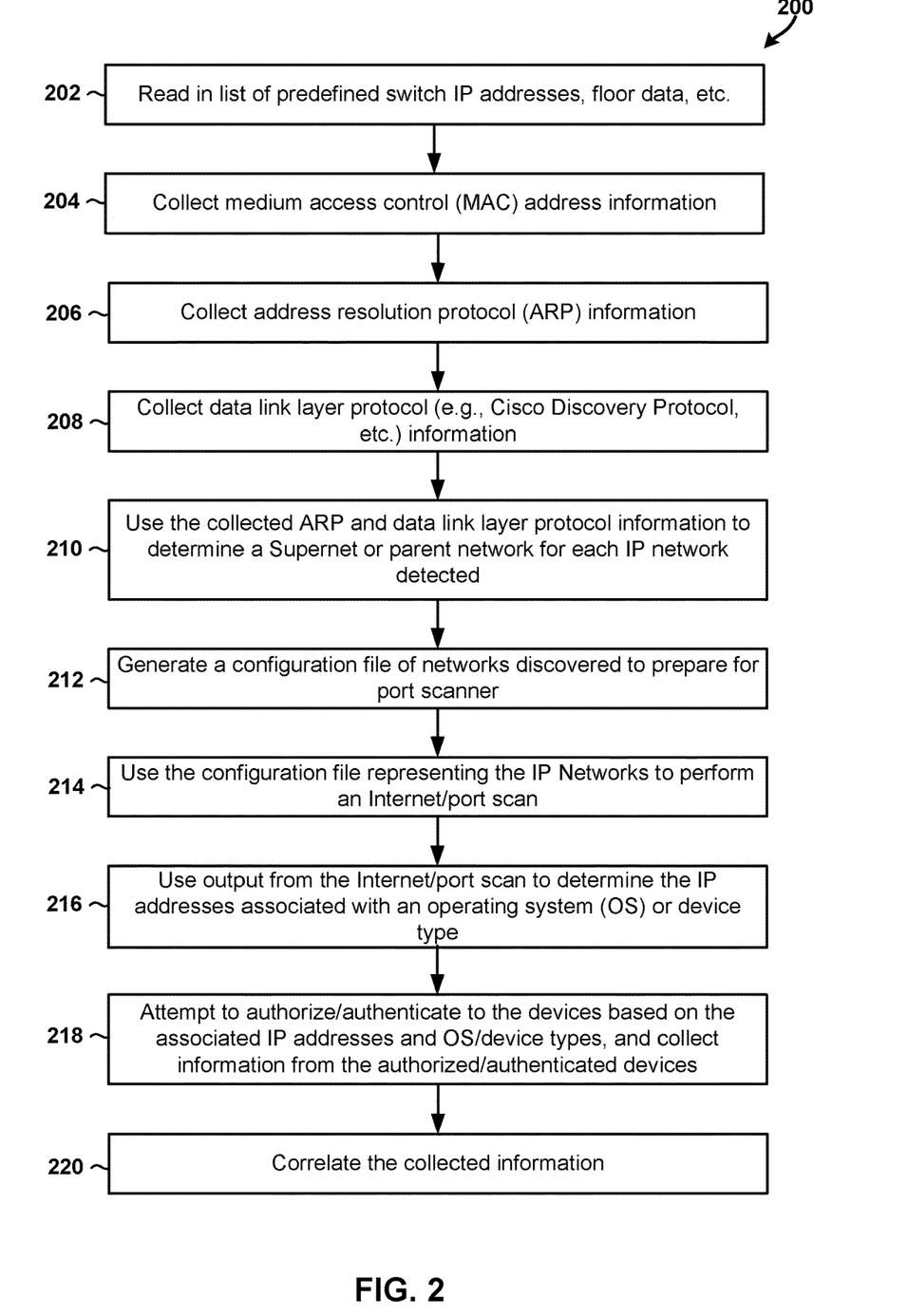
FIG. 2 is a process flow diagram illustrating a method of generating correlated data in accordance with some embodiments.

FIG. 2 illustrates a method 200 of generating correlated data for use generating detailed device profiles and network topologies in accordance with the embodiments. Method 200 may be performed by one or more processors in or one or more server computing devices that implement all or portions of a fast internetwork reconnaissance engine (e.g., fast internetwork reconnaissance engine 102 illustrated in FIG. 1).

In block 202, a processor in a server computing device may read in list of predefined switch IP addresses, floor data, and other similar information.

In block 204, the processor may collect medium access control (MAC) address information. In some embodiments, this may be accomplished by invoking a learnMacs process that receives IP address as input, creates a secure shell (SSH) connection to user equipment device or network device, uses the connection to issue various commands to collect information regarding the device, identifies the device type based on the collected information, queries a MAC address table, and stores or send the MAC addresses and other relevant information regarding the device for use by the processor. In some embodiments, the processor may parse the output and record MAC data to a file named macdata.txt.

In block 206, the processor may collect address resolution protocol (ARP) information. In some embodiments, this may be accomplished by invoking a learnArp process that receives IP address as input, creates a secure shell (SSH) connection to user equipment device or network device, uses the connection to issue various commands to collect information regarding the device, identifies the device type based on the collected information, queries a ARP table, and stores or send the ARP information and other relevant information regarding the device for use by the processor. In some embodiments, the processor may parse the output and record ARP information to a file named arp.txt.

In block 208, the processor may collect data link layer (DLL) protocol (e.g., Cisco® Discovery Protocol (CDP), etc.) information. In some embodiments, this may be accomplished by invoking a learnCdp process that receives IP address as input, creates a secure shell (SSH) connection to user equipment device or network device, uses the connection to issue various commands to collect information regarding the device, identifies the device type based on the collected information, queries a CDP, and stores or send the CDP information and other relevant information regarding the device for use by the processor. In some embodiments, the processor may parse the output and record ARP information to a file named CDP.txt.

In block 210, the processor may use the collected ARP and data link layer protocol information to determine a Supernet or parent network for each IP network detected. For example, the processor may read in ARP.txt and CDP.txt and parse the IP to isolate the Supernet or parent network for each IP network detected.

In block 212, the processor may generate a configuration file of networks discovered for use by an Internet/port scanner. For example, the processor may generate a configuration file of networks discovered to prepare for a mass IP port scanner (MASSCAN) tool, which is an Internet/port scanner. The processor may also write common network ports to scan in the configuration file.

In block 214, the processor may use the configuration file representing the IP Networks to perform an Internet/port scan. For example, the processor may use Expect to call the MASSCAN tool, passing the pre-generated configuration file representing the IP Networks to scan.

In block 216, the processor may use output from the Internet/port scan to determine the IP addresses associated with an operating system (OS) or device type. In block 218, the processor may attempt to authorize/authenticate to the devices based on the associated IP addresses and OS/device types, and collect information from the authorized/authenticated devices. For example, the processor may, from the scan output, determine which IP Addresses identify as windows in block 216 and attempt authorization using a windows service account on them via WMI CALL in block 218. The processor may also record all data in a file named windows.txt.

In block 220, the processor may correlate the collected information.

Figure 3A:
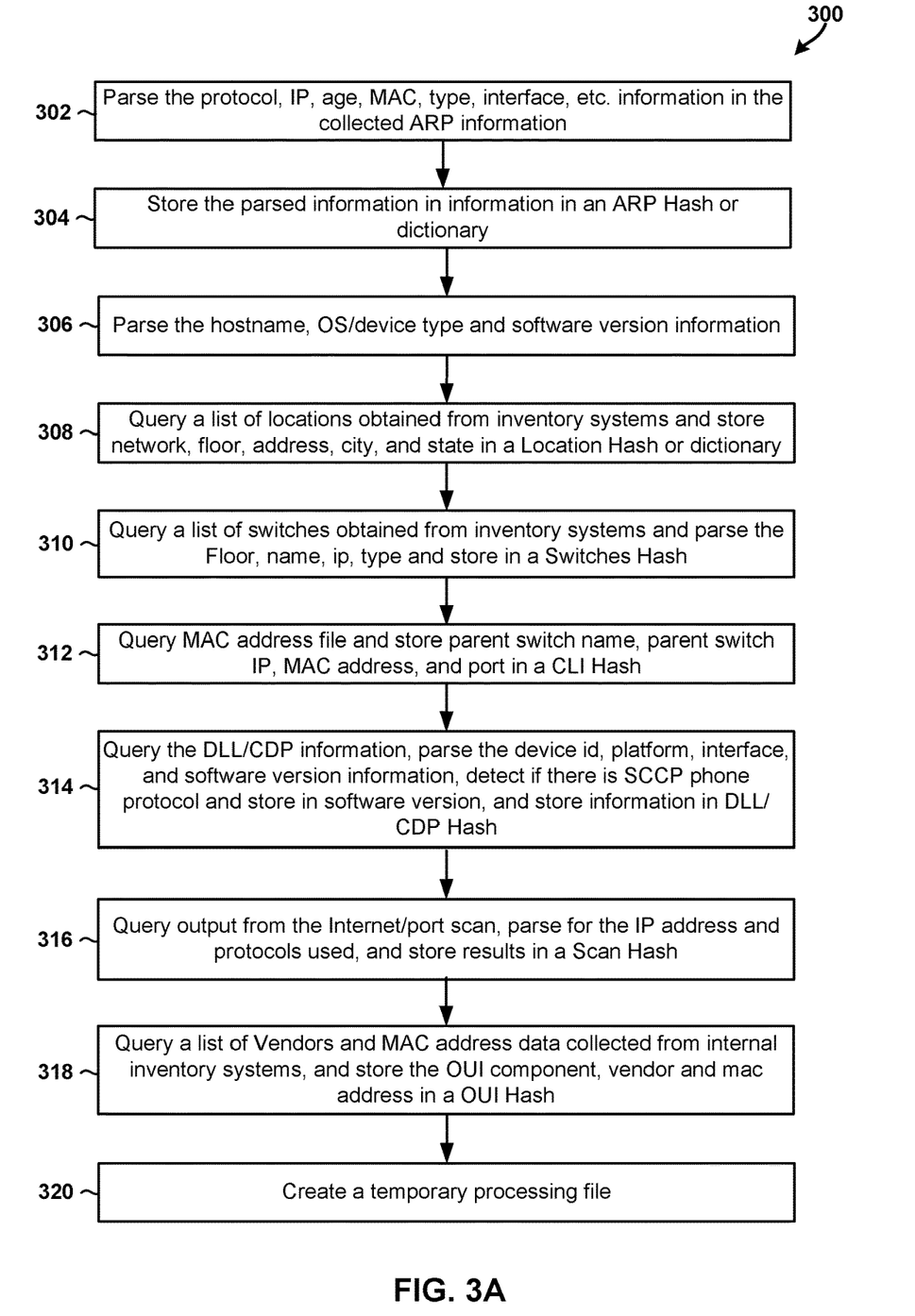
FIGS. 3A through 3C is a process flow diagram illustrating a method of using the correlated data to generate device profile in accordance with some embodiments.
Figure 3B:
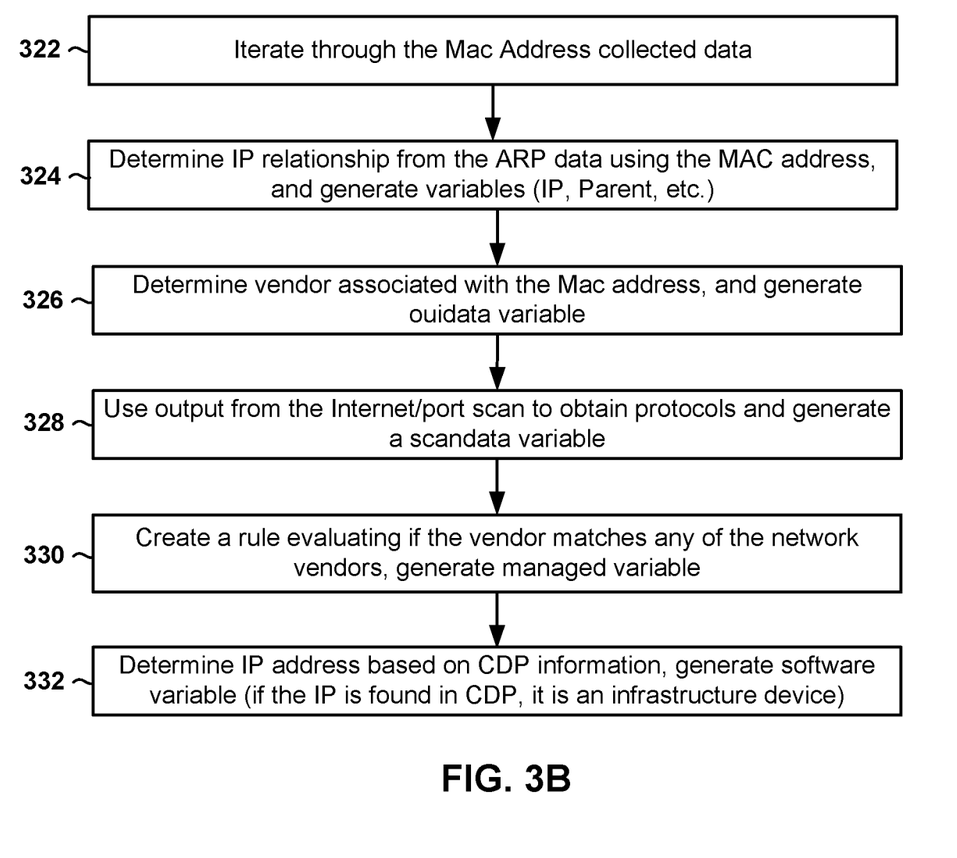
Figure 3C:
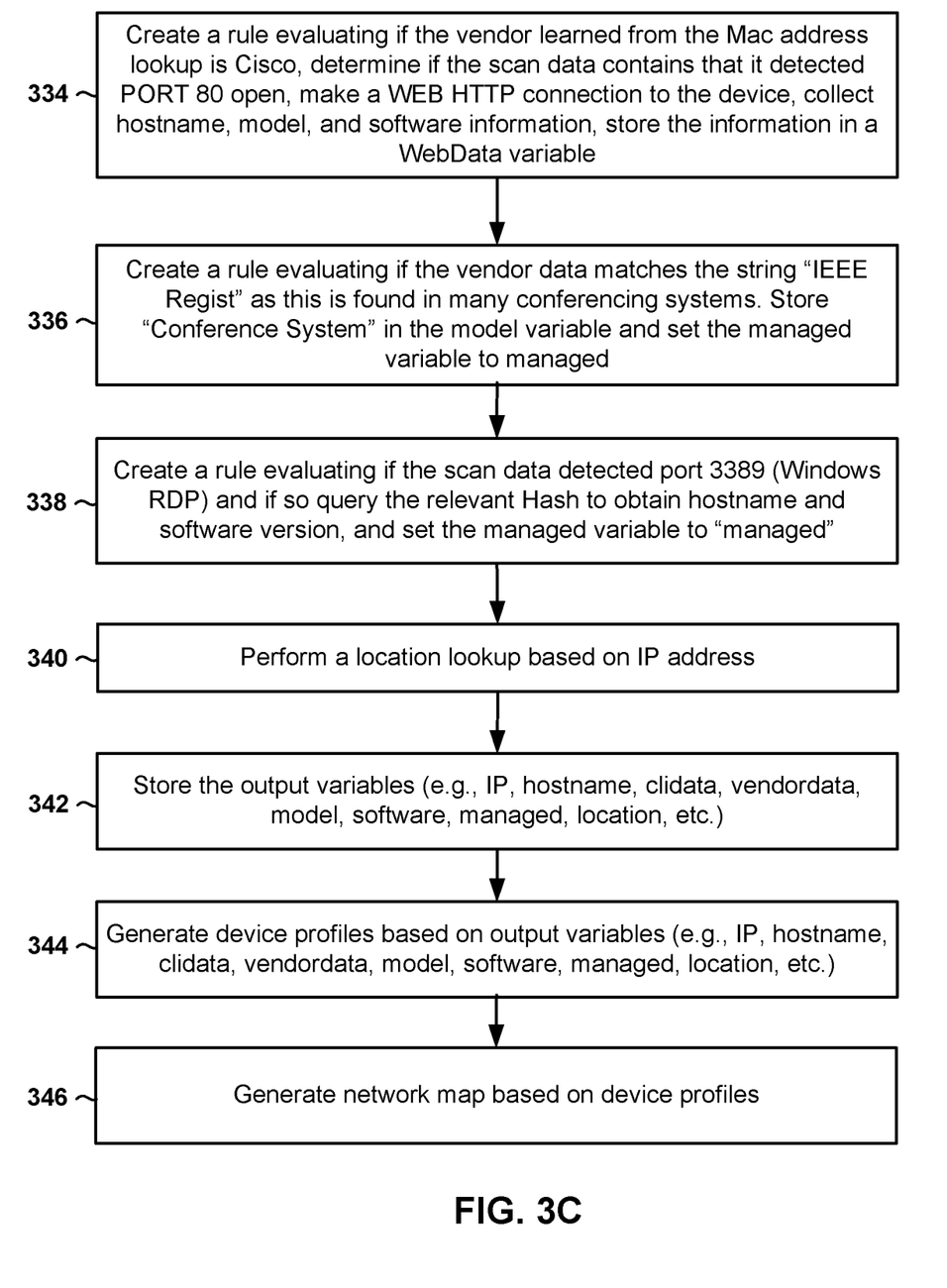

FIGS. 3A-3C illustrate a method 300 of using collated data to generate detailed device profiles and network topologies in accordance with the embodiments. Method 300 may be performed by one or more processors in or one or more server computing devices that implement all or portions of a fast internetwork reconnaissance engine (e.g., fast internetwork reconnaissance engine 102 illustrated in FIG. 1).

In block 302, a processor in a server computing device may traverse the correlated information generated in block 220, and parse the protocol, IP, age, MAC, type, interface, etc. information in the collected ARP information. For example, the processor may open an ARP.txt file and parse the protocol, IP, age, mac, type, interface, etc.

In block 304, the processor may store the parsed information in information in an ARP Hash (or dictionary, etc.). That is, the processor may save the information in a Hash or dictionary named "arp."

In block 306, the processor may parse the hostname, OS/device type and software version information. For example, the processor may open the windows discovered information and parse the hostname and software version from the WMI query.

In block 308, the processor may query a list of locations obtained from inventory systems and store network, floor, address, city, and state in a Location Hash (or dictionary, etc.). For example, the processor may open a list of locations obtained from inventory systems and store network, floor, address, city, and state in a Hash named locations.

In block 310, the processor may query a list of switches obtained from inventory systems and parse the floor, name, IP, type, and store the results in a Switches Hash. For example, the processor may open a list of switches obtained from inventory systems and parse the Floor, name, IP, type and store in a Hash named switches.

In block 312, the processor may query MAC address file and store parent switch name, parent switch IP, MAC address, and port in a CLI Hash. For example, the processor may open the mac address file and store parent switch name, parent switch IP, mac address, and port and store in a hash named cli.

In block 314, the processor may query the DLL/CDP information, parse the device id, platform, interface, and software version information, detect if there is SCCP phone protocol and store in software version, and store information in DLL/CDP Hash. For example, the processor may open the CDP file and parse the deviceid, platform, interface, and software version. The processor may detect if there is SCCP phone protocol and store in software version. The processor may store all information in a hash named CDP.

In block 316, the processor may query output from the Internet/port scan, parse for the IP address and protocols used, and store results in a Scan Hash. For example, the processor may open mass IP port scanner (MASSCAN) output and parse for the IP address and protocols used and store in a hash named scan.

In block 318, the processor may query a list of Vendors and MAC address data collected from internal inventory systems, and store the OUI component, vendor and mac address in a OUI Hash. For example, the processor may read in a list of vendors and MAC address data collected from internal inventory systems and store the OUI component, vendor and mac address in a hash named oui.

In block 320, the processor may create a temporary processing file based on the ARP Hash, Location Hash, Switches Hash, CLI Hash, DLL/CDP Hash, Scan Hash, Windows Hash, and/or OUI Hash.

With reference to FIG. 3B, in block 322, the processor may use the temporary processing file and iterate through the MAC address collected data.

In block 324, the processor may determine IP relationship from the ARP data using the MAC address, and generate variables (IP, Parent, etc.). For example, the processor may lookup if the ip relationship from the ARP data using the mac address and store in a variable named ip, also store the parent ip and hostname in which hosted the end device in a variable named parent.

In block 326, the processor may determine vendor associated with the Mac address, and generate ouidata variable. For example, the processor may lookup the vendor associated with the Mac Address and store in a variable named ouidata.

In block 328, the processor may use output from the Internet/port scan to obtain protocols and generate a scandata variable. For example, the processor may lookup the mass IP port scanner (MASSCAN) data and obtain protocols and store in a variable named scandata.

In block 330, the processor may create a rule evaluating if the vendor matches any of the network vendors, generate a managed variable. For example, the processor may create a rule evaluating if the vendor matches any of the network vendors such as CISCO, MOJO, RUCKUS, AMERICAN, EMERSON then mark as managed in a variable named managed.

In block 332, the processor may determine IP address based on CDP information, generate software variable (if the IP is found in CDP, it is an infrastructure device). For example, the processor may perform a lookup operation to see if the IP address is found in the CDP information. If it exists, the processor may set a variable named Software to the CDP version, and mark it as managed as this is infrastructure if is found in CDP.

With reference to FIG. 3C, in block 334, the processor may create a rule evaluating if the vendor learned from the Mac address lookup is Cisco, determine if the scan data contains that it detected PORT 80 open, make a WEB HTTP connection to the device, collect hostname, model, and software information, store the information in a WebData variable. For example, the processor may create a rule evaluating if the vendor learned from the Mac address lookup is Cisco and the scan data contains that it detected PORT 80 open. If so, the processor may make a WEB HTTP connection to the device and collect hostname, model, and software as most likely is a phone. The processor may store the information in a variable named WebData.

In block 336, the processor may create a rule evaluating if the vendor data matches the string "IEEE Regist," and store "Conference System" in the model variable, and set the managed variable to managed, in response to determining that the vendor data matches the string "IEEE Regist.

In block 338, the processor may create a rule evaluating if the scan data detected port 3389 (Windows RDP) and if so query the relevant Hashes (e.g., Windows Hash, ARP Hash, Location Hash, Switches Hash, CLI Hash, DLL/CDP Hash, Scan Hash, OUI Hash, etc.) to obtain hostname and software version, and set the managed variable to "managed."

In block 340, the processor may perform a location lookup based on IP address.

In block 342, the processor may store the output variables (e.g., IP, hostname, clidata, vendordata, model, software, managed, location, etc.) in a local or remote memory.

In block 344, the processor may generate device profiles based on output variables (or information elements), including any or all of the IP variable, Parent variable, ouidata variable, scandata variable, managed variable, software variable, WebData variable, model variable, clidata variable, hostname variable, clidata variable, and vendordata variable.

In block 346, the processor may generate network map based on device profiles.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200 and 300 may be substituted for or combined with one or more operations of the methods 200 and 300 and vice versa.

Figure 4:
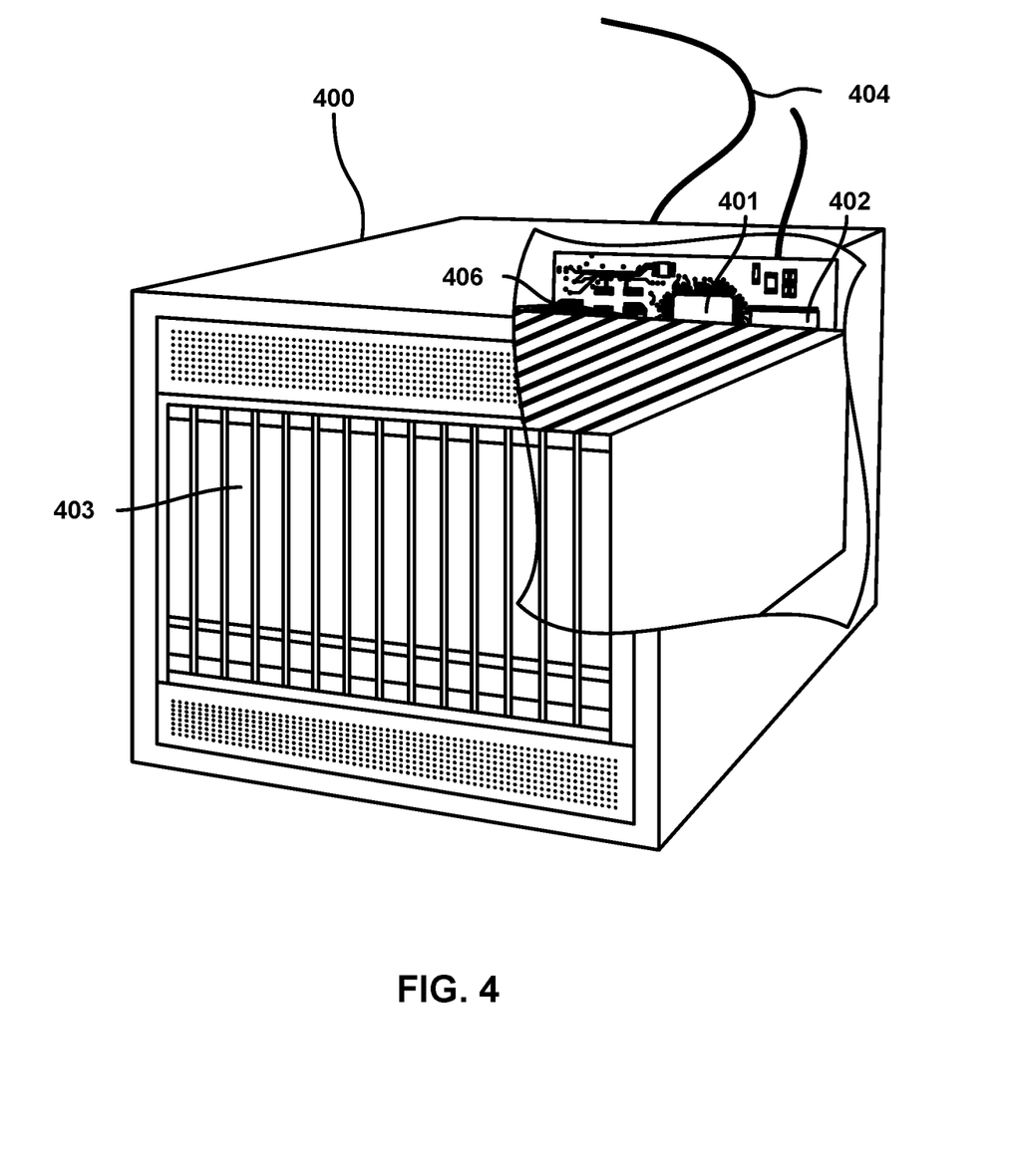
FIG. 4 is a component diagram of an example server suitable for implementing the various embodiments.

Various embodiments may be implemented on any of a variety of commercially available computing devices, such as the server computing device 400 illustrated in FIG. 4. Such a server device 400 may include a processor 401 coupled to volatile memory 402 and a large capacity nonvolatile memory, such as a disk drive 403. The server device 400 may also include a floppy disc drive, USB, compact disc (CD) or DVD disc drive coupled to the processor 401. The server device 400 may also include network access ports 406 coupled to the processor 401 for establishing data connections with a network connection circuit 404 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A server computing device, comprising:
a processor configured with processor-executable software instructions to:
perform a layer-2 scan of one or more communication networks to collect detailed information regarding devices attached to the one or more communication networks at a particular location,
wherein performing the layer-2 scan further comprises performing discovery operations comprising:
obtaining address resolution protocol (ARP) information from a routing element in the one or more communication networks; and
using the ARP information to generate an internet-protocol-to-medium-access-control (IP-to-MAC) address correlation for one or more of the devices attached to the one or more communication networks at the particular location; and use the collected detailed information to generate a device profile for each of the devices attached to the one or more communication networks at the particular location.

2. The server computing device of claim 1, wherein the processor is configured with processor-executable software instructions to:
use the generated device profile to perform at least one or more of:
an inventory control operation;
a wireless vendor integration operation; or
a security operation.

3. The server computing device of claim 2, wherein the processor is configured with processor-executable software instructions to perform the security operation by:
determining whether any of the devices attached to any of the one or more communication networks is non-benign; and
initiating a mitigating action in response to determining that a device is non-benign.

4. The server computing device of claim 3, wherein the processor is configured with processor-executable software instructions to initiate the mitigating action by performing at least one or more of:
generating a notification message identifying the devices that are non-benign; or
quarantining the devices that are non-benign.

5. The server computing device of claim 1, wherein the processor is configured with processor-executable software instructions to perform the layer-2 scan of the one or more communication networks to collect the detailed information regarding the devices attached to the one or more communication networks at the particular location by further performing operations that include at least one or more of:
learning a network topology of the one or more communication networks;
learning device interconnects of the devices attached to the one or more communication networks at the particular location; or
providing basic identity management to the devices attached to the one or more communication networks at the particular location.

6. The server computing device of claim 1, wherein the processor is configured with processor-executable software instructions to perform the layer-2 scan of the one or more communication networks to collect the detailed information regarding the devices attached to the one or more communication networks at the particular location by further:
using at least one or more of a networking protocol, a network scan tool, a programming language, a low level socket communication, artificial intelligence, machine learning, or modular distributed architecture to fingerprint or analyze at least one or more of:
the one or more communication networks; or
the devices attached to the one or more communication networks at the particular location.

7. The server computing device of claim 1, wherein the processor is configured with processor-executable software instructions to perform the layer-2 scan of the one or more communication networks to collect the detailed information regarding the devices attached to the one or more communication networks at the particular location by further acquiring or consuming data from at least one or more of:
a command line system;
an application programing interface (API);
a database;
an inventory control system;
a web service; or
a common network protocol.

8. The server computing device of claim 1, wherein the processor is configured with processor-executable software instructions to perform the layer-2 scan of the one or more communication networks to collect the detailed information regarding the devices attached to the one or more communication networks at the particular location by further:
accessing host endpoints and resource devices to collect information from various sources and ports, including at least one or more of:
routing and switching infrastructure (TCP port 22);
windows management instrumentation (WMI) host access (TCP ports 135, 137 or 139);
simple network management protocol (SNMP) host access UDP port 161;
hypertext transfer protocol (HTTP) host access (TCP ports 80 or 443); or
Mysql DB internal (TCP port 3306).

9. The server computing device of claim 1, wherein the processor is configured with processor-executable software instructions to perform the layer-2 scan of the one or more communication networks to collect the detailed information regarding the devices attached to the one or more communication networks at the particular location by further connecting to a switching element to obtain medium access control (MAC) address information and learn about a directly connected host.

10. The server computing device of claim 1, wherein the processor is configured with processor-executable software instructions such that performing the discovery operations further comprises:
connecting to switches or switching elements based on predefined internet protocol (IP) address data located within a service provider network;
obtaining medium access control (MAC) address information from a switching element in the one or more communication networks;
using the obtained MAC address information to identify one or more directly connected hosts;
determining a switch type of the switching element; and
using a secure shell (SSH) console to connect to the switching element and collect MAC address data.

11. The server computing device of claim 10, wherein the processor is configured with processor-executable software instructions such that performing the discovery operations further comprises:
using the predefined IP address data to determine a router type of the routing element; and
using the SSH console to connect to the routing element.

12. The server computing device of claim 11, wherein the processor is configured with processor-executable software instructions such that performing the discovery operations further comprises:
using the IP-to-MAC address correlation to identify an IP network or IP subnet at the particular location;
formulating network TCP scan prerequisites based on the identified IP network or IP subnet; and
using the network TCP scan prerequisites to initiate a network TCP scan of well-known application service protocol ports.

13. The server computing device of claim 12, wherein the processor is configured with processor-executable software instructions such that performing the discovery operations further comprises:
- collecting information from internal inventory databases to learn known device inventory properties;
- establishing database connections to internal databases to learn details of existing equipment;
- using a network management solution to authenticate the one or more of the devices attached to the one or more communication networks at the particular location and discover more attributes from hosts identified during the network TCP scan; and
- using pre-defined service accounts, SNMP strings, HTTP CALLS or administrative accounts to access equipment or obtain detailed inventory information.

14. The server computing device of claim 13, wherein the processor is configured with processor-executable software instructions such that performing the discovery operations further comprises:
- determining a management status and general characteristics of the devices attached to the one or more communication networks at the particular location; and
- generating the device profile for the devices attached to the one or more communication networks at the particular location.

15. The server computing device of claim 14, wherein the processor is configured with processor-executable software instructions so that generating the device profile for each of the connected devices based on any or all of the collected or generated information comprises generating the device profile to include at least one or more of:
- a device IP information element (IE);
- a hostname IE;
- a parent switch IP IE;
- a parent switch name IE;
- a MAC address IE;
- a port IE;
- a vendor IE;
- management IE; or
- a location IE.

16. A method of profiling components in one or more communication networks, comprising:
- performing, by a processor in a server computing device, a layer-2 scan of the one or more communication networks to collect detailed information regarding devices attached to the one or more communication networks at a particular location,
  - wherein performing the layer-2 scan further comprises performing discovery operations comprising:
    - obtaining address resolution protocol (ARP) information from a routing element in the one or more communication networks; and
    - using the ARP information to generate an internet-protocol-to-medium-access-control (IP-to-MAC) address correlation for one or more of the devices attached to the one or more communication networks at the particular location; and
- using, by the processor, the collected detailed information to generate a device profile for each of the devices attached to the one or more communication networks at the particular location.

17. The method of claim 16, further comprising using the generated device profile to perform at least one or more of:
- an inventory control operation;
- a wireless vendor integration operation; or
- a security operation.

18. The method of claim 17, wherein performing the security operation comprises:
- determining whether any of the devices attached to any of the one or more communication networks is non-benign; and
- initiating a mitigating action in response to determining that a device is non-benign.

19. The method of claim 18, wherein initiating the mitigating action comprises performing at least one or more of:
- generating a notification message identifying the devices that are non-benign; or
- quarantining the devices that are non-benign.

20. The method of claim 16, wherein performing the layer-2 scan of the one or more communication networks to collect the detailed information regarding the devices attached to the one or more communication networks at the particular location further comprises performing operations that include at least one or more of:
- learning a network topology of the one or more communication networks;
- learning device interconnects of the devices attached to the one or more communication networks at the particular location; or
- providing basic identity management to the devices attached to the one or more communication networks at the particular location.

21. The method of claim 16, wherein performing the layer-2 scan of the one or more communication networks to collect the detailed information regarding the devices attached to the one or more communication networks at the particular location further comprises:
- using at least one or more of a networking protocol, a network scan tool, a programming language, a low level socket communication, artificial intelligence, machine learning, or modular distributed architecture to fingerprint or analyze at least one or more of:
  - the one or more communication networks; or
  - the devices attached to the one or more communication networks at the particular location.

22. The method of claim 16, wherein performing the layer-2 scan of the one or more communication networks to collect the detailed information regarding the devices attached to the one or more communication networks at the particular location further comprises acquiring or consuming data from at least one or more of:
- a command line system;
- an application programing interface (API);
- a database;
- an inventory control system;
- a web service; or
- a common network protocol.

23. The method of claim 16, wherein performing the layer-2 scan of the one or more communication networks to collect the detailed information regarding the devices attached to the one or more communication networks at the particular location further comprises:
- accessing host endpoints and resource devices to collect information from various sources and ports, including at least one or more of:
  - routing and switching infrastructure (TCP port 22);
  - windows management instrumentation (WMI) host access (TCP ports 135, 137 or 139);
  - simple network management protocol (SNMP) host access UDP port 161;
  - hypertext transfer protocol (HTTP) host access (TCP ports 80 or 443); or
  - Mysql DB internal (TCP port 3306).

24. The method of claim 16, wherein performing the layer-2 scan of the one or more communication networks to collect the detailed information regarding the devices attached to the one or more communication networks at the particular location further comprises connecting to a switching element to obtain medium access control (MAC) address information and learn about a directly connected host.

25. The method of claim 16, wherein performing the discovery operations further comprises:
connecting to switches or switching elements based on predefined internet protocol (IP) address data located within a service provider network;
obtaining medium access control (MAC) address information from a switching element in the one or more communication networks;
using the obtained MAC address information to identify one or more directly connected hosts;
determining a switch type of the switching element; and
using a secure shell (SSH) console to connect to the switching element and collect MAC address data.

26. The method of claim 25, wherein performing the discovery operations further comprises:
using the predefined IP address data to determine a router type of the routing element; and
using the SSH console to connect to the routing element.

27. The method of claim 26, wherein performing the discovery operations further comprises:
using the IP-to-MAC address correlation to identify an IP network or IP subnet at the particular location;
formulating network TCP scan prerequisites based on the identified IP network or IP subnet; and
using the network TCP scan prerequisites to initiate a network TCP scan of well-known application service protocol ports.

28. The method of claim 27, wherein performing the discovery operations further comprises:
collecting information from internal inventory databases to learn known device inventory properties;
establishing database connections to internal databases to learn details of existing equipment;
using a network management solution to authenticate one or more of the devices attached to the one or more communication networks at the particular location and discover more attributes from hosts identified during the network TCP scan; and
using pre-defined service accounts, SNMP strings, HTTP CALLS or administrative accounts to access equipment or obtain detailed inventory information.

29. The method of claim 28, wherein performing the discovery operations further comprises:
determining a management status and general characteristics of the devices attached to the one or more communication networks at the particular location; and
generating the device profile for the devices attached to the one or more communication networks at the particular location.

30. The method of claim 29, wherein generating the device profile for each of the connected devices based on any or all of the collected or generated information comprises generating the device profile to include at least one or more of:
a device IP information element (IE);
a hostname IE;
a parent switch IP IE;
a parent switch name IE;
a MAC address IE;
a port IE;
a vendor IE;
management IE; or
a location IE.

31. A non-transitory computer readable storage medium having stored thereon processor-executable software instructions configured to cause a processor in a server computing device to perform operations for profiling components in one or more communication networks, the operations comprising:
performing a layer-2 scan of the one or more communication networks to collect detailed information regarding devices attached to the one or more communication networks at a particular location,
wherein performing the layer-2 scan further comprises performing discovery operations comprising:
obtaining address resolution protocol (ARP) information from a routing element in the one or more communication networks; and
using the ARP information to generate an internet-protocol-to-medium-access-control (IP-to-MAC) address correlation for one or more of the devices attached to the one or more communication networks at the particular location; and
using the collected detailed information to generate a device profile for each of the devices attached to the one or more communication networks at the particular location.

32. The non-transitory computer readable storage medium of claim 31, wherein the stored processor-executable software instructions are configured to cause the processor to perform operations further comprising using the generated device profile to perform at least one or more of:
an inventory control operation;
a wireless vendor integration operation; or
a security operation.

33. The non-transitory computer readable storage medium of claim 32, wherein the stored processor-executable software instructions are configured to cause the processor to perform operations such that performing the security operation comprises:
determining whether any of the devices attached to any of the one or more communication networks is non-benign; and
initiating a mitigating action in response to determining that a device is non-benign.

34. The non-transitory computer readable storage medium of claim 33, wherein the stored processor-executable software instructions are configured to cause the processor to perform operations such that initiating the mitigating action comprises performing at least one or more of:
generating a notification message identifying the devices that are non-benign; or
quarantining the devices that are non-benign.

35. The non-transitory computer readable storage medium of claim 31, wherein the stored processor-executable software instructions are configured to cause the processor to perform operations such that performing the layer-2 scan of the one or more communication networks to collect the detailed information regarding the devices attached to the one or more communication networks at the particular location further comprises performing operations that include at least one or more of:
learning a network topology of the one or more communication networks;
learning device interconnects of the devices attached to the one or more communication networks at the particular location; or providing basic identity management to the devices attached to the one or more communication networks at the particular location.

36. The non-transitory computer readable storage medium of claim 31, wherein the stored processor-executable software instructions are configured to cause the processor to perform operations such that performing the layer-2 scan of the one or more communication networks to collect the detailed information regarding the devices attached to the one or more communication networks at the particular location further comprises:
using at least one or more of a networking protocol, a network scan tool, a programming language, a low level socket communication, artificial intelligence, machine learning, or modular distributed architecture to fingerprint or analyze at least one or more of:
the one or more communication networks; or
the devices attached to the one or more communication networks at the particular location.

37. The non-transitory computer readable storage medium of claim 31, wherein the stored processor-executable software instructions are configured to cause the processor to perform operations such that performing the layer-2 scan of the one or more communication networks to collect the detailed information regarding the devices attached to the one or more communication networks at the particular location further comprises:
acquiring or consuming data from at least one or more of:
a command line system;
an application programing interface (API);
a database;
an inventory control system;
a web service; or
a common network protocol.

38. The non-transitory computer readable storage medium of claim 31, wherein the stored processor-executable software instructions are configured to cause the processor to perform operations such that performing the layer-2 scan of the one or more communication networks to collect the detailed information regarding the devices attached to the one or more communication networks at the particular location further comprises:
accessing host endpoints and resource devices to collect information from various sources and ports, including at least one or more of:
routing and switching infrastructure (TCP port 22);
windows management instrumentation (WMI) host access (TCP ports 135, 137 or 139);
simple network management protocol (SNMP) host access UDP port 161;
hypertext transfer protocol (HTTP) host access (TCP ports 80 or 443); or
Mysql DB internal (TCP port 3306).

39. The non-transitory computer readable storage medium of claim 31, wherein the stored processor-executable software instructions are configured to cause the processor to perform operations such that performing the layer-2 scan of the one or more communication networks to collect the detailed information regarding the devices attached to the one or more communication networks at the particular location further comprises:
connecting to a switching element to obtain medium access control (MAC) address information and learn about a directly connected host.

40. The non-transitory computer readable storage medium of claim 31, wherein the stored processor-executable software instructions are configured to cause the processor to perform operations such that performing the discovery operations further comprises:
connecting to switches or switching elements based on predefined internet protocol (IP) address data located within a service provider network;
obtaining medium access control (MAC) address information from a switching element in the one or more communication networks;
using the obtained MAC address information to identify one or more directly connected hosts;
determining a switch type of the switching element; and
using a secure shell (SSH) console to connect to the switching element and collect MAC address data.

41. The non-transitory computer readable storage medium of claim 40, wherein the stored processor-executable software instructions are configured to cause the processor to perform operations such that performing the discovery operations further comprises:
using the predefined IP address data to determine a router type of the routing element; and
using the SSH console to connect to the routing element.

42. The non-transitory computer readable storage medium of claim 41, wherein the stored processor-executable software instructions are configured to cause the processor to perform operations such that performing the discovery operations further comprises:
using the IP-to-MAC address correlation to identify an IP network or IP subnet at the particular location;
formulating network TCP scan prerequisites based on the identified IP network or IP subnet; and
using the network TCP scan prerequisites to initiate a network TCP scan of well-known application service protocol ports.

43. The non-transitory computer readable storage medium of claim 42, wherein the stored processor-executable software instructions are configured to cause the processor to perform operations such that performing the discovery operations further comprises:
collecting information from internal inventory databases to learn known device inventory properties;
establishing database connections to internal databases to learn details of existing equipment;
using a network management solution to authenticate one or more of the devices attached to the one or more communication networks at the particular location and discover more attributes from hosts identified during the network TCP scan; and
using pre-defined service accounts, SNMP strings, HTTP CALLS or administrative accounts to access equipment or obtain detailed inventory information.

44. The non-transitory computer readable storage medium of claim 43, wherein the stored processor-executable software instructions are configured to cause the processor to perform operations such that performing the discovery operations further comprises:
determining a management status and general characteristics of the devices attached to the one or more communication networks at the particular location; and
generating the device profile for the devices attached to the one or more communication networks at the particular location.

45. The non-transitory computer readable storage medium of claim 44, wherein the stored processor-executable software instructions are configured to cause the processor to perform operations such that generating the device profile for each of the connected devices based on any or all of the collected or generated information comprises generating the device profile to include at least one or more of:
- a device IP information element (IE);
- a hostname IE;
- a parent switch IP IE;
- a parent switch name IE;
- a MAC address IE;
- a port IE;
- a vendor IE;
- management IE; or
- a location IE.

\* \* \* \* \*